(12) United States Patent
Tsai et al.

(10) Patent No.: US 12,195,205 B2
(45) Date of Patent: Jan. 14, 2025

(54) PROPELLANT INJECTOR SYSTEM FOR PLASMA PRODUCTION DEVICES AND THRUSTERS

(71) Applicant: PHASE FOUR, INC., El Segundo, CA (US)

(72) Inventors: David Tsai, El Segundo, CA (US); Derek Thompson, El Segundo, CA (US); Mohammed Umair Siddiqui, El Segundo, CA (US)

(73) Assignee: PHASE FOUR, INC., El Segundo, CA (US)

( * ) Notice: Subject to any disclaimer, the term of this patent is extended or adjusted under 35 U.S.C. 154(b) by 71 days.

(21) Appl. No.: 17/635,677

(22) PCT Filed: Sep. 1, 2020

(86) PCT No.: PCT/US2020/048924
§ 371 (c)(1),
(2) Date: Feb. 15, 2022

(87) PCT Pub. No.: WO2021/046044
PCT Pub. Date: Mar. 11, 2021

(65) Prior Publication Data
US 2022/0281620 A1 Sep. 8, 2022

Related U.S. Application Data

(60) Provisional application No. 62/895,816, filed on Sep. 4, 2019.

(51) Int. Cl.
*B64G 1/40* (2006.01)
*F03H 1/00* (2006.01)
*H05H 1/54* (2006.01)

(52) U.S. Cl.
CPC ........... *B64G 1/405* (2013.01); *F03H 1/0012* (2013.01); *H05H 1/54* (2013.01)

(58) Field of Classification Search
CPC ..................................................... F03H 1/0012
See application file for complete search history.

(56) References Cited

U.S. PATENT DOCUMENTS 2,992,345 A 7/1961 Siegfried et al.
3,173,248 A 3/1965 Curtis et al.
(Continued)

FOREIGN PATENT DOCUMENTS

CN 104411082 A 3/2015
EP 3560298 A1 10/2019
(Continued)

OTHER PUBLICATIONS

Kuwahara "High-Density Helicon Plasma Thrusters Using Electrodeless Acceleration Schemes" (Year: 2015).*
(Continued)

*Primary Examiner* — Arun Goyal
*Assistant Examiner* — William L Breazeal
(74) *Attorney, Agent, or Firm* — Steinfl + Bruno LLP (57) ABSTRACT

An electrothermal plasma production device is presented. The plasma production device includes: a plasma production chamber; an RF antenna external to the plasma production chamber; a propellant tank and flow regulator external to the plasma production chamber and in communication with the plasma production chamber; and a plenum disposed between the propellant tank and the plasma production chamber. The RF antenna, in combination with an AC power source, is configured to provide an RF energy to an interior region of the plasma production chamber and to an interior region of the plenum with sufficient power to ionize at least some of the propellant in the plenum. The plasma production cham- (Continued)

ber is configured to include a propellant injector for receiving propellant at a first closed end of the plasma production chamber.

18 Claims, 9 Drawing Sheets

(56) References Cited

U.S. PATENT DOCUMENTS

| | | | |
|---|---|---|---|
| 3,388,291 A | 6/1968 | Cann | |
| 4,301,391 A | 11/1981 | Seliger et al. | |
| 4,548,033 A | 10/1985 | Cann | |
| 4,862,032 A | 8/1989 | Kaufman et al. | |
| 4,909,914 A | 3/1990 | Chiba et al. | |
| 4,978,071 A | 12/1990 | MacLean et al. | |
| 5,339,623 A | 8/1994 | Smith | |
| 5,418,431 A | 5/1995 | Williamson et al. | |
| 5,751,113 A | 5/1998 | Yashnov et al. | |
| 5,945,781 A | 8/1999 | Valentian | |
| 6,293,090 B1 | 9/2001 | Olson | |
| 6,334,302 B1* | 1/2002 | Chang-Diaz | F03H 1/0093 60/203.1 |
| 6,449,941 B1 | 9/2002 | Warboys et al. | |
| 6,609,363 B1 | 8/2003 | Dressler et al. | |
| 6,771,026 B2 | 8/2004 | Vukovic | |
| 7,176,469 B2 | 2/2007 | Leung et al. | |
| 7,400,096 B1 | 7/2008 | Foster et al. | |
| 7,461,502 B2 | 12/2008 | Emsellem | |
| 7,498,592 B2 | 3/2009 | Hershkowitz et al. | |
| 7,679,025 B1 | 3/2010 | Krishnan et al. | |
| 7,875,867 B2 | 1/2011 | Hershkowitz et al. | |
| 8,593,064 B2 | 11/2013 | Chang Diaz | |
| 8,610,356 B2 | 12/2013 | Szabo, Jr. et al. | |
| 8,635,850 B1 | 1/2014 | Light et al. | |
| 8,729,806 B2 | 5/2014 | Kwan et al. | |
| 8,875,485 B2 | 11/2014 | Keidar et al. | |
| 9,215,789 B1 | 12/2015 | Hala et al. | |
| 9,334,855 B1 | 5/2016 | Hruby et al. | |
| 9,591,741 B2 | 3/2017 | Larigaldie | |
| 11,067,065 B2 | 7/2021 | Siddiqui et al. | |
| 11,231,023 B2 | 1/2022 | Siddiqui | |
| 11,325,727 B2 | 5/2022 | Longmier et al. | |
| 11,365,016 B2 | 6/2022 | Longmier et al. | |
| 2002/0008451 A1 | 1/2002 | Gibson | |
| 2006/0064984 A1 | 3/2006 | Gratton et al. | |
| 2008/0093506 A1 | 4/2008 | Emsellem et al. | |
| 2009/0166554 A1 | 7/2009 | Radovanov et al. | |
| 2010/0213851 A1 | 8/2010 | Chang Diaz | |
| 2011/0226422 A1 | 9/2011 | Kwan et al. | |
| 2012/0080148 A1 | 4/2012 | Zhang | |
| 2012/0217876 A1 | 8/2012 | Diamant et al. | |
| 2013/0067883 A1 | 3/2013 | Emsellem et al. | |
| 2013/0200219 A1 | 8/2013 | Marchandise et al. | |
| 2014/0202131 A1 | 7/2014 | Boswell | |
| 2014/0263181 A1 | 9/2014 | Park | |
| 2016/0200458 A1 | 7/2016 | Longmier et al. | |
| 2016/0207642 A1* | 7/2016 | Longmier | F03H 1/0037 |
| 2017/0210493 A1* | 7/2017 | Marchandise | F03H 1/0018 |
| 2018/0043457 A1 | 2/2018 | Hoeger et al. | |
| 2018/0216605 A1 | 8/2018 | Rafalskyi et al. | |
| 2018/0310393 A1 | 10/2018 | Castillo Acero et al. | |
| 2019/0107103 A1 | 4/2019 | Siddiqui | |
| 2019/0107104 A1 | 4/2019 | Siddiqui | |
| 2019/0390662 A1 | 12/2019 | Siddiqui et al. | |

FOREIGN PATENT DOCUMENTS

| | | | |
|---|---|---|---|
| EP | 3695117 A1 | 8/2020 | |
| EP | 3129653 B1 | 9/2020 | |
| JP | 6263179 B2 | 1/2018 | |
| JP | 2020537323 A | 12/2020 | |
| WO | 2008/100642 A2 | 8/2008 | |
| WO | 2015/031447 A1 | 3/2015 | |
| WO | 2015/031450 A1 | 3/2015 | |
| WO | 2015/155004 A1 | 10/2015 | |
| WO | 2018/118223 A1 | 6/2018 | |
| WO | 2019/074785 A1 | 4/2019 | |

OTHER PUBLICATIONS

Berenguer "Plasma Reactors and Plasma Thrusters Modeling by Ar Complete Global Models" (Year: 2012).*
Duchemin "Cryostorage of Propellants for Electric Propulsion" (Year: 2009).*
Chiravalle, V.P., et al., "Non-Equilibrium Numerical Study ofa Two-Stage Microwave Electrothermal Thruster," 27th International Electric Propulsion Conference, Oct. 15-19, 2001. 11 Pages.
International Preliminary Report on Patentability for International PCT Application No. PCT/US2020/048924 filed on Sep. 1, 2020, filed on behalf of Phase Four, Inc. Mail Date: Sep. 28, 2021. 29 Pages.
International Search Report for International PCT Application No. PCT/US2020/048924 filed on Sep. 1, 2020, filed on behalfof Phase Four, Inc. Mail Date: Nov. 13, 2020. 3 Pages.
Paschen's Law. Wikipedia Page. Downloaded on Feb. 15, 2022, from https://en.wikipedia.org/wiki/Paschen%27s law. 5 Pages.
Written Opinion for International PCT Application No. PCT/US2020/048924 filed on Sep. 1, 2020, filed on behalf of Phase Four, Inc. Mail Date: Nov. 13, 2020. 6 Pages.
Bathgate, S. N., et al., "Electrodeless plasma thrusters for spacecraft: a review", *Plasmas Sci. Technol.*, 2017, vol. 19, pp. 1-24.
BC wire "Copper MagnetWire" (Year: 2015).
Blackwell D. et al., "Two-dimensional imaging ofa helicon discharge" *Plasma Sources Science and Technology*, Sep. 1997, 9 pages.
Bonoli, P. T., "Review of recent experimental and modeling progress in the lower hybrid range of frequencies at ITER relevant parameters", *Physics of Plasmas*, 2014, vol. 21, pp. 061508-1-061508-22.
Boswell R. "Very efficient plasma generation by whistler waves near the lower hybrid frequency" *Plasma Physics and Controlled Fusion*, vol. 26, No. 10, pp. 1147-1162, Feb. 1984.
Cannat, F., et al., "Optimization ofa coaxial electron cyclotron resonance plasma thruster with an analytical model", *Physics of Plasmas*, 2015, vol. 22, pp. 053503-1-053503-11.
Chabert P. et al., "Physics of Radio-Frequency Plasma" Cambridge University Press, Feb. 2011, 395 pages.
Charles C. "Topical Review: Plasmas for spacecraft propulsion" Journal ofPhysics D: Applied Physics, vol. 42, No. 16, Aug. 2009, 18 pages.
Chen, F. F., et al., "Upper Limit to Landau Damping in Helicon Discharges", Physical Review Letters, 1999, vol. 82, No. 13, pp. 2677-2680.
Chen, F. F., "Helicon discharges and sources: a review", *Plasmas Sources Sci. Technol.*, 2015, vol. 24, pp. 1-25.
Choi, G., "13.56 MHz, Class-E, 1 KW RF Generator using a Microsemi DRF1200 Driver/MOSFET Hybrid", retrieved from www.microsemi.com, 2013, pp. 1-10.
Choueiri, E. Y., et al., "Coherent Ion Acceleration using Two Electrostatic Waves", 36th AIAA/ASME/SAE/ASSE JointPropulsion Conference, Huntsville, AL, 2000, pp. 1-12.
Collard, T. A., et al., "A Numerical Examination ofthe Performance of Small Magnetic Nozzle Thrusters", 53rd AIA/SAE/ASEE Joint Propulsion Conference, 2017, pp. 1-16.
Communication pursuant to Rules 161(2) and 162 EPC issued for EP Patent Application No. 20861790.2 filed on Mar. 29, 2022, on behalf of Phase Four, Inc. Mail Date: Apr. 21, 2022. 3 Pages.
Corrected Notice of Allowability for U.S. Appl. No. 16/165,138 filed on Oct. 19, 2018, on behalf of Phase Four Inc. Mail Date: Nov. 5, 2021. 2 Pages.
Courtney, D. G., et al., "Diverging Cusped-Field Hall Thruster (DCHT)", 30th International Electric Propulsion Conference, Florence, Italy, 2007, pp. 1-10.
Dedrick, J., et al., "Transient propagation dynamics of flowing plasmas accelerated by radio-frequency electric fields", *Physics of Plasmas*, 2017, vol. 24, pp. 050703-1-050703-4.

(56) References Cited

OTHER PUBLICATIONS

Ellingboe, A. R., et al., "Electron beam pulses produced by heliconwave excitation", Physics of Plasmas, 1995, vol. 2, No. 6, pp. 1807-1809.
EP Communication pursuant to Article 94(3) EPC for EP Application No. 17882721.8 filed on Oct. 30, 2017 on behalf of Phase Four, Inc. Mail Date: Nov. 10, 2021, 8 pages.
Extended European Search Report for EP Application No. 17882721.8 filed on Oct. 30, 2017 on behalf of Phase Four, Inc. Mail Date: Jul. 14, 2020 8 pages.
Extended European Search Report for EP Application No. 18865461.0 filed on Oct. 15, 2018 on behalf of Phase Four Inc. Mail Date: Jun. 9, 2021 14 pages.
Final Office Action for U.S. Appl. No. 14/914,056, filed Feb. 24, 2016 on behalf of Phase Four Inc Mail Date: May 14, 2019 19 pages.
Final Office Action for U.S. Appl. No. 14/914,056, filed Feb. 24, 2016 on behalf of Phase Four Inc Mail Date: Nov. 6, 2020 36 pages.
Final Office Action for U.S. Appl. No. 14/914,056, filed Feb. 24, 2016 on behalf of Phase Four Inc Mail Date: Oct. 3, 2017 25 pages.
Final Office Action for U.S. Appl. No. 14/914,065, filed Feb. 24, 2016 on behalf of Phase Four Inc Mail Date: Apr. 4, 2019 17 pages.
Final Office Action for U.S. Appl. No. 14/914,065, filed Feb. 24, 2016 on behalf of Phase Four, Inc. Mail Date: Dec. 27, 2021. 33 pages.
Final Office Action for U.S. Appl. No. 14/914,065, filed Feb. 24, 2016 on behalf of Phase Four Inc Mail Date: Oct. 6, 2020 30 pages.
Final Office Action for U.S. Appl. No. 14/914,065, filed Feb. 24, 2016 on behalf of Phase Four Inc Mail Date: Oct. 2, 2017 28 pages.
Final Office Action for U.S. Appl. No. 15/982,862, filed May 17, 2018 on behalf of Phase Four Inc Mail Date: Nov. 2, 2020 39 pages.
Final Office Action for U.S. Appl. No. 16/165,138 filed on Oct. 19, 2018 on behalf of Phase Four Inc Mail Date: Jan. 21, 2020 42 pages.
Final Office Action for U.S. Appl. No. 16/165,138 filed on Oct. 19, 2018, on behalf of Phase Four Inc. Mail Date: Mar. 26, 2021. 32 Pages.
Final Office Action for U.S. Appl. No. 16/439,205 filed on Jun. 12, 2019 on behalfof Phase Four Inc Mail Date: Nov. 24, 2020 19 pages.
Gerst D. et al., "Plasma drift in a low-pressure magnetized radio frequency discharge" Plasma Sources Science and Technology Institute of Physics Publishing, vol. 22 No. 1, Jan. 2013, 6 pages.
Gerwin, R. A., Integrity ofthe Plasma Magnetic Nozzle, Los Alamos National Laboratory, Los Alamos, New Mexico, 2009, NASA/TP-2009213439, pp. 1-120.
Gilland, J., et al., "Neutral pumping in a helicon discharge", Plasmas Sources Sci. Technol., 1998, pp. 416-422.
Gilland, J., "Helicon Wave Physics Impacts On Electrodeless Thruster Design", International Electric Propulsion Conference ERPS, Toulouse, France, 2003, pp. 1-10.
Hofer, R. F., et al., "A Comparison of Nude and Collimated Faraday Probes for Use with Hall Thrusters", 27th International Electric Propulsion Conference, Pasadena, CA, 2001, pp. 1-17.
Hopwood, J., "Review ofinductively coupled plasmas for plasma processing", Plasma Sources Sci. Technol., 1992, vol. 1, pp. 109-116.
Hsu, A.G., et al., "Laboratory Testing of a Modular 8-Thruster Scalable Ion Electrospray Propulsion System", retrieved from https://iepc2017.org/sites/default/files/speaker-papers/aiaa_iepc_paper_electrospray_hsu_final.pdf on May 17, 2018, pp. 1-12.
Huba, J.D., "NRL Plasma Formulary", Naval Research Laboratory, Washington DC, 2013. pp. 1-71.
International Preliminary Report on Patentability for International Application No. PCT/US2014/052856 filed on Aug. 27, 2014 on behalf of The Regents of the University of Michigan Mail Date: Mar. 1, 2016. 7 pages.
International Preliminary Report on Patentability for International Application No. PCT/US2014/052861 filed on Aug. 27, 2014 on behalf of The Regents of the University of Michigan Mail Date: Mar. 1, 2016 8 pages.

International Preliminary Report on Patentability issued for International Application No. PCT/US2017/059096 filed on Oct. 30, 2017 on behalf of Phase Four Inc Mail Date: Jun. 25, 2019. 4 Pages.
International Preliminary Report on Patentability issued for International Application No. PCT/US2018/054555 filed on Oct. 5, 2018 on behalf of Phase Four, Inc. Mail Date: Apr. 14, 2020. 8 Pages.
International Search Report and Written Opinion for International Application No. PCT/US2014/052856 filed on Aug. 27, 2014 on behalf of The Regents of the University of Michigan Mail Date: Dec. 12, 2014 9 pages.
International Search Report and Written Opinion for International Application No. PCT/US2014/052861 filed on Aug. 27, 2014 on behalf of The Regents of the University of Michigan Mail Date: Dec. 12, 2014 8 pages.
International Search Report and Written Opinion for International Application No. PCT/US2017/059096 filed on Oct. 30, 2017 on behalfof Phase Four Inc Mail Date: Jan. 29, 2018 7 pages.
International Search Report and Written Opinion for International Application No. PCT/US2018/054555 filed on Oct. 5, 2018 on behalf of Phase Four, Inc. Mail Date: Dec. 7, 2018 15 pages.
Jacobson, V. T., et al., "DevelopmentofVASIMR Helicon Source", 43rd Annual Meeting of the APS Division of Plasma Physics Mini-Conference on Helicon Sources, Long Beach, California, 2001, pp. 1-35.
Kikuchi, T., et al., "Plasma Production and Wave Propagation in a Plasma Source Using Lower Hybrid Waves", Jpn. J. Appl. Phys., 1999, vol. 38, pp. 4351-4356.
Kinder, R. L., et al., "Noncollisional heating and electron energy distributions in magnetically enhanced inductively coupled and helicon plasma sources", Journal of Applied Physics, 2001, vol. 90, No. 8, pp. 3699-3712.
Kolobov V. I. et al., "Review Article: The anomalous kin effect in gas discharge plasmas" Plasma Sources Science and Technology Institute of Physics Publishing, vol. 6 No. 2, May 1997, 17 pages.
Liou, J. J., et al., "RF MOSFET: recent advances, current status and future trends", Solid-State Electronics, 2003, vol. 47, pp. 1881-1895.
Longmier B. et al., "A Large Delta-V Plasma Thruster for Nanosatellites" Interplanetary Small Satellite Conference, 2014, 24 pages.
Longmier B. et al., "Ambipolar Ion Acceleration in a 20,000 G Magnetic Nozzle" 2013 Abstracts IEEE International Conference on Plasma Science, Jun. 2013, 17 pages.
Longmier B. et al., "Ambipolar Ion Acceleration in the Expanding Magnetic Nozzle ofthe VASIMR VX-200i" 45th AIAA/ASME/SAE/ASEE Joint Propulsion Conference & Exhibit, Aug. 2009, 11 pages.
Longmier, B. W., et al., "VX-200 Magnetoplasma Thruster Performance Results Exceeding Fifty-Percent Thruster Efficiency", Journal of Propulsion and Power, 2011, vol. 27, No. 4, pp. 915-920.
Longmier, B.W., et al., "Ambipolar ion acceleration in an expanding magneticnozzle," Plasma Sources Sci. Technol 20 015007, 2011. 10 Pages.
Magee, R. M., et al., "Direct measurements ofthe ionization profile in krypton helicon plasmas", Physics of Plasmas, 2012. vol. 19, pp. 123506-1-123506-6.
Motomura T. et al., "Characteristics oflarge diameter, high-density helicon plasma with short axial length using a flat spiral antenna" Journal of Plasma and Fusion Research Series, vol. 8, Sep. 2009, 5 pages.
Nakamura, T., et al., "Direct Measurement of Electromagnetic Thrust if Electrodeless Helicon Plasma Thruster Using Magnetic Nozzle", World Academy of Science, Engineering, and Technology, 2012, vol. 6, No. 11, pp. 581-585.
Nishiyama, K., et al., "Development and Testing of the Hayabusa2 Ion Engine System", Joint Conference of 30th International Symposium of Space Technology and Science 34th International Electric Propulsion Conference and 6th Nano-satellite Symposium, Hyogo—Kobe, Japan, 2015, pp. 1-15.
Non-Final Office Action for U.S. Appl. No. 14/914,056, filed Feb. 24, 2016 on behalf of Phase Four Inc Mail Date: Jan. 19, 2017 14 pages.

(56) References Cited

OTHER PUBLICATIONS

Non-Final Office Action for U.S. Appl. No. 14/914,056, filed Feb. 24, 2016 on behalf of Phase Four Inc Mail Date: Jan. 21, 2020 35 pages.
Non-Final Office Action for U.S. Appl. No. 14/914,056, filed Feb. 24, 2016 on behalf of Phase Four Inc Mail Date: Jul. 10, 2018 23 pages.
Non-Final Office Action for U.S. Appl. No. 14/914,056, filed Feb. 24, 2016 on behalf of Phase Four, Inc. Mail Date: Jun. 24, 2021 27 pages.
Non-Final Office Action for U.S. Appl. No. 14/914,065, filed Feb. 24, 2016 on behalf of Phase Four Inc Mail Date: Dec. 12, 2019 19 pages.
Non-Final Office Action for U.S. Appl. No. 14/914,065, filed Feb. 24, 2016 on behalf of Phase Four Inc Mail Date: Dec. 14, 2016 14 pages.
Non-Final Office Action for U.S. Appl. No. 14/914,065, filed Feb. 24, 2016 on behalf of Phase Four, Inc. Mail Date: Jun. 11, 2021 30 pages.
Non-Final Office Action for U.S. Appl. No. 14/914,065, filed Feb. 24, 2016 on behalf of Phase Four Inc Mail Date: Jun. 13, 2018 18 pages.
Non-Final Office Action for U.S. Appl. No. 15/982,862, filed May 17, 2018 on behalf of Phase Four Inc Mail Date: Jan. 22, 2020 39 pages.
Non-Final Office Action for U.S. Appl. No. 16/165,138 filed on Oct. 19, 2018 on behalf of Phase Four Inc Mail Date: Aug. 14, 2020 33 pages.
Non-Final Office Action for U.S. Appl. No. 16/165,138 filed on Oct. 19, 2018 on behalf of Phase Four Inc Mail Date: May 16, 2019 35 pages.
Non-Final Office Action for U.S. Appl. No. 16/439,205, filed Jun. 12, 2019 on behalf of Phase Four Inc Mail Date: Feb. 5, 2020 19 pages.
Notice of Allowance for U.S. Appl. No. 14/914,056, filed Feb. 24, 2016 on behalf of Phase Four, Inc. Mail Date: Jan. 12, 2022. 12 Pages.
Notice of Allowance for U.S. Appl. No. 14/914,065, filed Feb. 24, 2016 on behalf of Phase Four, Inc. Mail Date: Mar. 16, 2022. 16 Pages.
Notice of Allowance for U.S. Appl. No. 16/165,138 filed on Oct. 19, 2018, on behalf of Phase Four Inc. Mail Date: Sep. 22, 2021. 17 Pages.
Notice of Allowance for U.S. Appl. No. 16/165,138 filed on Oct. 19, 2018 on behalf of Phase Four Inc. Mail Date: Dec. 8, 2021. 10 Pages.
Notice of Allowance for U.S. Appl. No. 16/439,205, filed Jun. 12, 2019, on behalf of Phase Four Inc. Mail Date: Jun. 10, 2021. 9 Pages.
Otto, A., "Chapter 1—Introduction and Review of Basic Plasma Properties", *University of Alaska Fairbanks*, pp. 1-22.

Pavarin D. et al., "Design of 50W Helicon Plasma Thruster" *31st International Electric Propulsion Conference*, Sep. 2009, 9 pages.
Plihon N. et al. "Experimental investigation of double layers in expanding plasmas" Physics of Plasmas, vol. 14, Jan. 2007, 16 pages.
Power J. et al., "Developmentofa High Power Microwave Thruster, With a Magnetic Nozzle, for Space Applications" *24th Microwave Power Symposium*, Aug. 1989.
Scime, E. E., et al., "The hothelicon experiment (HELIX) and the large experimenton instabilities and anisotropy (LEIA)", J. Plasma Physics, 2014, pp. 1-22.
Shabshelowitz, A., et al., "Performance and Probe Measurements of a Radio-Frequency Plasma Thruster", Journal of Propulsion and Power, 2013, vol. 29, No. 4, pp. 919-929.
Siddiqui, M. U. et al., "Electron heating and density production in microwave-assisted helicon plasmas", *Plasma Sources Sci. Technol.*, 2015, vol. 24, pp. 1-13.
Siddiqui, M. U., et al., "First Performance Measurements of the Phase Four RF Thruster", *35th International Electric Propulsion Conference*, Atlanta, GA, 2017, pp. 1-21.
Siddiqui, M.U., "Updated Performance Measurements ofthe Phase Four RF Thruster", *34th Space Symposium*, 2018, pp. 1-7.
Stephan, K. et al., "Absolute partial electron impactionization cross sections of Xe from threshold up to 180 eV", *Journal of Chemical Physics*, 1984, vol. 81, No. 7, pp. 3116-3117.
Takahashi, K., et al., "Direct thrust measurement of a permanent magnet helicon double layer thruster", *Applied Physics Letters*, 2011, vol. 98, pp. 141503-1-141503-3.
Takahashi K. et al., "Effect of magnetic and physical nozzles on plasma thruster performance" Plasma Sources Science and Technology Institute of Physics Publishing, vol. 23 No. 4, Jul. 2014, 9 pages.
Takahashi K. et al., "Ion acceleration in a solenoid-free plasma expanded by permanent magnets" Physics of Plasmas, Aug. 2008, 4 pages.
Takahiro N. et al., "Thrust Performance of High Magnetic Field Permanent Magnet Type Helicon Plasma Thruster" *50th AIAA/ASME/SAE/ASEE Joint Propulsion Conference*, Jul. 2014, pp. 1-8.
Wikipedia: Electron Cyclotron Resonance (Year: 2019).
Wikipedia: "Gyroradius"(Year: 2019).
Williams, L.T., et al., "Thrust Measurements ofa Radio Frequency Plasma Source", Journal of Propulsion and Power, 2013, vol. 29, No. 3, pp. 520-527.
Yildiz M. et al., "Global Energy Transfer Model of Microwave Induced Plasma in a Microwave Electrothermal Thruster Resonant Cavity" *Joint Conference of 30th International Symposium on Space Technology and Science*, Jul. 2015, 10 pages.
Supplementary European Extended Search Report issued for EP Patent Application No. 20861790.2 filed on Mar. 29, 2022, on behalf of Phase Four, Inc. Mail Date: Feb. 21, 2024. 16 Pages.
Communication pursuant to Rule 164(1) EPC issued for EP Patent Application No. 20861790.2 filed on Mar. 29, 2022, on behalf of Phase Four, Inc. Mail Date: Oct. 23, 2023. 16 Pages.

\* cited by examiner

PROPELLANT INJECTOR SYSTEM FOR PLASMA PRODUCTION DEVICES AND THRUSTERS

CROSS-REFERENCE TO RELATED APPLICATIONS

This application is the U.S. National Stage of International Patent Application No. PCT/US2020/048924, filed on Sep. 1, 2020, which in turn claims benefit of U.S. Provisional Application No. 62/895,816, filed on Sep. 4, 2019, the contents of which are is hereby incorporated by reference in their its entirety.

STATEMENT OF GOVERNMENT-SPONSORED RESEARCH

N/A.

FIELD OF THE INVENTION

This invention generally relates to propellant injection and control systems used in association with plasma production devices including plasma thrusters.

BACKGROUND OF THE INVENTION

Radio frequency (RF) thrusters are electric propulsion systems that use radio frequency electromagnetic signals to accelerate a plasma propellant, thereby generating thrust. A common propellant for use in such systems is supercritically-stored xenon. Xenon has several advantages over other propellants including: (i) it is a chemically inert gas, (ii) its first ionization potential is relatively low (12.13 eV/ion) and (iii) it is relatively easy to pump in vacuum facilities by means of condensation on cryopumps.

However, xenon has significant drawbacks in that it is rare, expensive, and difficult to obtain. The widespread and increasing use of xenon for spacecraft propulsion, as well as the expansion of non-propulsive applications, has made the availability of xenon a significant concern and expense.

It is desirable to develop other, more commonly-available propellants for plasma-based thrusters for spacecraft propulsion and other non-propulsive applications. In addition to reducing the expense associated with plasma production for both terrestrial and extraterrestrial applications, alternate fuel sources for spacecraft propulsion that are more readily-available opens the possibility that fuel may be obtained (e.g., mined) during a mission, thereby reducing the weight and expense at launch. Water vapor is one material that, as a propellant, provides several benefits over xenon including its availability, low expense, ease of storage and transport, and the potential for satellites to be refueled on orbit. However, the use of water vapor as a propellant poses its own set of technical design considerations and challenges. Furthermore, it is desirable to develop a common thruster architecture that is adapted for a variety of different condensable propellants.

SUMMARY OF THE INVENTION

In one aspect, the invention provides a plasma production device that includes:
(a) a plasma production chamber having a first closed end comprising an aperture and a second open end;
(b) a radio frequency (RF) antenna external to the plasma production chamber, electrically coupled to an AC power source, and configured to deliver an RF energy to an interior region of the plasma production chamber;
(c) a propellant tank and flow regulator in communication with the plasma production chamber and configured to deliver a propellant into the plasma production chamber; and
(d) a plenum, wherein the plenum is disposed between the propellant tank and the plasma production chamber;
wherein the plenum is adapted to accept propellant at an upstream end from the propellant tank and dispense propellant at a downstream end into the plasma production chamber through the aperture; and
wherein the plasma production device is configured such that, when propellant is flowing from the propellant tank to the plasma production chamber, the propellant has a plenum pressure ($P_p$) that is greater than a plasma production chamber pressure ($P_c$).

In some embodiments, the plenum volume is about 1%-50% of the plasma production chamber volume including, for example about 1%, 2.5%, 5%, 7.5%, 10%, 15%, 20%, 25%, 30%, 35%, 40%, 45%, or 50%, or less than about 5%, 7.5%, 10%, 15%, 20%, 25%, 30%, 35%, 40%, 45%, or 50% of the plasma production chamber volume.

In some embodiments, the closed end comprises a closed-end portion of the RF antenna. In some embodiments, the antenna comprises a coiled antenna, a flat spiral antenna, and/or a flat spiral coiled hybrid antenna, as described herein.

In some embodiments, the antenna is configured to deliver an RF energy to an interior region of the plenum. In some embodiments, the closed-end portion of the RF antenna is so configured. Optionally, the plasma production device, including the RF antenna and plenum, is configured to deliver the RF energy to an interior region of the plenum with sufficient power to ionize at least some of the propellant in the plenum to form a plasma within the plenum. In some embodiments, the plenum is configured to direct plasma ions and electrons into the (interior of the) plasma production chamber.

In some embodiments, the aperture is configured to maintain $P_p > P_c$ when propellant is flowing from the propellant tank into the plasma production chamber. In some embodiments, the propellant pressure ($P_p$) is established to optimize the probability of propellant ionization in the plenum.

In another aspect, the invention provides a plasma production device that includes:
(a) a downstream plasma production chamber having a first closed end and a second open end wherein the closed end comprises a propellant injector providing a propellant flow path between an outer face and an inner face;
(b) a radio frequency (RF) antenna external to the plasma production chamber, electrically coupled to an AC power source, and configured to deliver an RF energy to an interior region of the plasma production chamber;
(c) an upstream propellant tank and flow regulator in communication with the injector; and
wherein the injector comprises at least one outer face aperture and two or more inner face apertures, wherein the propellant tank is in communication with the at least one outer face aperture and the at least one outer face aperture is in communication with the inner face apertures; and
wherein at least one inner face aperture is disposed laterally relative to the longitudinal axis of the plasma production chamber.

In some embodiments, the injector comprises one inner face aperture aligned with the longitudinal axis of the plasma production device. Optionally, the injector comprises a plurality of laterally-disposed inner face apertures. The plurality of laterally-disposed inner face apertures may be arranged in a symmetrical pattern (e.g., in a pattern of one or more concentric rings), an asymmetrical pattern, or even randomly located.

The antenna used in conjunction with this aspect of the invention may have the same structure and configuration as described above and elsewhere herein.

This plasma production device of this aspect of the invention also may comprise a plenum as described above and elsewhere herein (i.e., such that the plasma production device comprises both a plenum and a propellant injector having a plurality of inner face apertures.

In some embodiments of any of foregoing aspects of the invention, the plasma production device is configured as a thrust-producing device including, for example, a satellite thruster or other motor or motor component that may be used for on-orbit applications.

By "AC power source" is meant an upstream component that provides alternating current to a downstream component. An AC power source may directly provide alternating current or may be the combination of a direct current (DC) power source and a DC-to-AC converter such as an inverter, and optionally a power amplifier. Optionally, the AC power source may be coupled to the antenna via a passive electrical circuit called a "matching network."

By "ion" is meant the positively-charged plasma ions formed from the neutral propellant, as distinguished from the negatively-charged electrons.

By "plasma" is meant an ionized state of matter generated from a neutral propellant gas that primarily consists of free negatively-charged electrons and positively-charged ions, wherein, the density of charged particles, $n_c$ is greater than 0.5% of the density of total particles $n_T$ (charged and neutral) in the system, or $n_c/n_T > 0.005$.

By "plasma liner" is meant the physical chamber in which the propellant is ionized to form plasma. In some embodiments, the plasma liner is cylindrical having a cylinder body, a closed end and an open end. Propellant may be introduced into the plasma liner through an aperture, nozzle, or injector in the closed end. Alternatively, the propellant may be introduced to the cylinder body (i.e., the side wall), as described herein. Typically, propellant will be introduced through the cylinder body at or near the closed end (i.e., within the upstream 5%, 10%, 15%, 20% or 25% of the cylinder body). The open end serves as an exit for the plasma which, in conjunction with the associated magnetic field described herein forms a nozzle for directing the plasma out of the plasma liner. The plasma liner may be constructed from, or lined with, any suitable material that is resistant to plasma-induced corrosion and/or erosion. Suitable plasma liner materials include, for example, various ceramics; such as alumina, boron nitride, aluminum nitride, and Macor®; glasses such as borosilicate, quartz, and Pyrex®; and refractory metals such as graphite, tungsten, carbon, tantalum, and molybdenum.

By "plume" is meant the area immediately outside of the open end of the plasma liner and is formed by the ejection of plasma ions and electrons from within the plasma liner. The "plume" may refer to the plume of the thruster generally, in thruster applications, or the plume of the plasma liner component of the thruster, specifically, from which the plasma ions are ejected.

By "propellant" is meant an electrically neutral atomic, molecular, or mixed species that is capable of being ionized into plasma. Suitable propellants may be condensable or non-condensable. In some embodiments, the propellant is condensable into a liquid or solid. In particular, the propellant forms a gas or vapor under operating conditions (i.e., when present in the plasma production chamber or plenum under conditions suitable for plasma formation) but is condensed or condensable into a liquid or solid under storage conditions such as in the propellant storage tank. Condensable propellants suitable for use in certain aspects of the inventive plasma production devices (e.g., satellite thrusters) described herein include, for example, ammonia, iodine ($I_2$), water and water vapor, bismuth, magnesium, cesium, zinc, caffeine, methane ($CH_4$), ethane ($C_2H_6$), propane ($C_3H_8$), butane ($C_4H_{10}$), and other higher order alkanes, and hydrogen peroxide. Suitable non-condensable propellants include, for example, xenon, krypton, argon, air and other $N_2$—$O_2$ mixtures, nitrogen ($N_2$), oxygen ($O_2$), carbon dioxide ($CO_2$), and dinitrogen oxide ($N_2O$).

By "VHF band" or "very high frequency band" is meant the range of radio frequency (RF) or electromagnetic radiation waves having a frequency of 30-300 MHz, including, for example the band at about 100-300 MHz, 150-300 MHz, 200-300 MHz, 100-250 MHz, 150-250 MHz, and 100-200 MHz.

The terms "outer face aperture" and "inner face aperture" refer to apertures on the closed end of the plasma production chamber, wherein the "inner face" of that chamber is the facing or otherwise exposed to the plasma production chamber interior (i.e., downstream-facing) and the "outer face" is upstream-facing (i.e., facing towards the plenum or otherwise provides the input location for the propellant to enter the plasma production chamber.

DETAILED DESCRIPTION

The present invention provides an electrothermal RF thruster design and associated propellant delivery system that may utilize a variety of propellants, including condensable propellants such as water vapor and iodine. As described herein, one embodiment of the invention provides unique components and design characteristics that facilitate the use of water vapor as a propellant, but which can be applied to other primary propellant species and particularly condensable propellant species.

The disclosed electrothermal RF thruster design and associated components may be miniaturized to the mass, volume, and power budget of Cube Satellites (CubeSats) to meet the propulsion needs of the small satellite (~5 to ~500 kg) constellations and all-electric satellite buses. Propulsion systems constructed according to the principles described herein may be simple, scalable, robust, and relatively inexpensive compared to existing systems using other propulsion technologies.

Plasma Production Device

Figure 1:
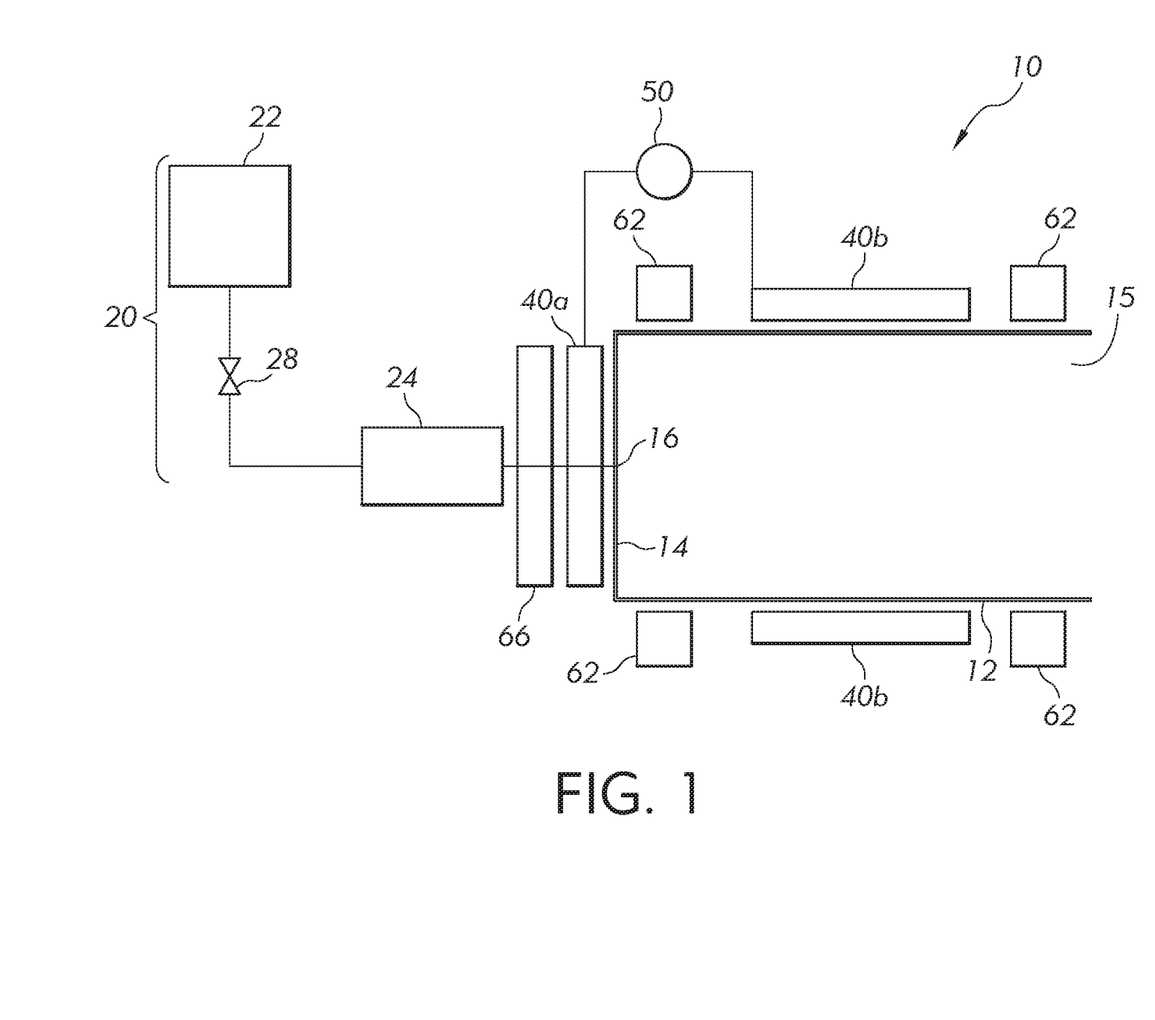
FIG. 1 is a schematic diagram of a plasma production device.

FIG. 1 is a schematic diagram of the core components of a plasma production device 10 and associated components. The plasma production device 10 includes a plasma liner 12 (also referred to as a plasma chamber) with a closed end 14 and an open end 15. A propellant is injected into the plasma liner 12 from the closed end 14 in the direction of the open end 15 and is energized therein to produce plasma.

A propellant delivery system 20 is located external to the plasma liner 12 and includes at least a propellant tank 22 and a plenum 24. The propellant tank 22 serves as a reservoir for pressurized and/or condensed propellant 26. The propellant tank 22 is configured to deliver a flow of the propellant 26 to the plenum 24, and the plenum 24 is configured to deliver the propellant 26 to the interior of the plasma liner 12. Optionally, the propellant delivery system 20 also comprises a flow regulator 28 configured to meter the flow of the propellant 26 between the propellant tank 22 and the plenum 24.

The plasma liner 12 is surrounded by an antenna assembly 40 through which an alternating current is driven at a specified frequency. The antenna assembly 40 is configured to radiate radio frequency (RF) energy into the plasma liner 12. When the propellant 26 is injected into the liner 12, the RF energy provided by the antenna assembly 40 ionizes the propellant 26 and then heats the subsequent plasma. In some embodiments, the RF energy may radiate at frequencies in the high frequency (HF) to very high frequency (VHF) bands (from 3 to 30 MHz and 30 to 300 MHz, respectively). Other frequencies also may be used.

In some embodiments, the antenna assembly 40 may include a flat spiral portion 40a that is disposed against the exterior surface of the closed end 14 of the plasma liner 12 (or at least in close proximity to the closed end 14), and/or a coiled portion 40b wrapped around the body of the plasma liner 12 in the direction of the open end 15. The flat spiral portion 40a has a spiral configuration that expands in a radial direction from a central point but with no change/extension of the coils in a longitudinal direction. In other words, a "flat" spiral is planar. The coil portion 40b may be a standard coil (e.g., half-helix, helical, etc.) or another suitable antenna configuration.

The combination of the flat spiral portion 40a and the coiled portion 40b may be referred to as a "flat spiral coil hybrid" antenna ("FSCH" antenna). In one configuration, the plane of the flat spiral portion 40a is perpendicular to the longitudinal axis of the coiled portion 40b. In some embodiments, the FSCH antenna is configured to cause a constructive interference in magnetic fields produced in the plasma liner 12 and to cause ionization of the propellant 26 into plasma when the propellant 26 is exposed to the antenna's RF field under appropriate pressure and power conditions as described herein.

The alternating current to the antenna assembly 40 is supplied from a power control system 50 such as a terrestrial alternating current power source (e.g., grid power), or from solar panels and/or DC batteries for space (on-orbit) applications. When supplied by a battery, direct current (DC) from the battery may be converted to alternating current (AC) by an inverter or other DC-AC converting device. A power amplifier also may be used to boost the power of the alternating current, and a frequency modulator may be used to set its frequency. In some embodiments, antenna assembly 40 is configured to deliver RF energy into plenum 24 and plasma liner 12 at a desired power and frequency. In particular, the flat spiral portion of an FSCH may be configured and positioned such that the generated RF energy is delivered to both while coiled portion delivers RF energy substantially only to plasma liner 12. In one configuration, the flat spiral portion is "sandwiched" between plasma liner 12 and plenum 24 such that the flat spiral portion delivers a substantial amount of RF energy into the plenum.

A magnet system 60, having radially-disposed magnets 62, surrounds at least a portion of the body of the plasma liner 12. The magnets 62 are coaxially aligned relative to the longitudinal axis of the plasma liner 12, and each magnet 62 produces a magnetic field of the same polarity (either positive or negative) within the plasma liner 12. In one embodiment, the magnet system 60 also may include a planar magnet 66 in combination with the radially-disposed magnets 62 and disposed at or in close proximity to the closed end 14. The magnet system 60 acts to prevent the plasma ions from impacting the interior surface of the liner 12.

Additional design considerations of the plasma production device 10 may be found in U.S. Patent Publication 2019/0107103 and published PCT application WO 2018/118223, each of which is hereby incorporated by reference in its entirety.

The Plenum

Figure 2:
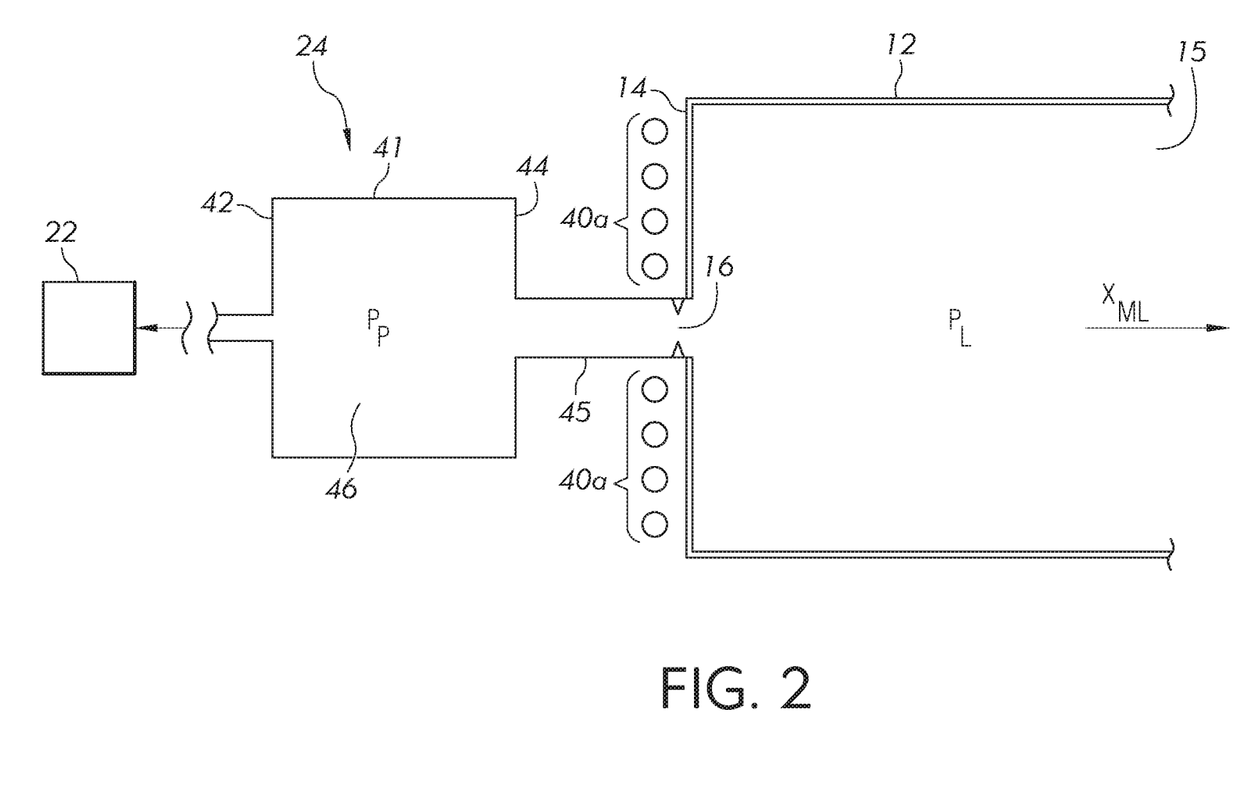
FIG. 2 is a schematic diagram of a plenum and its attachment to a plasma liner.

FIG. 2 illustrates the principles of plenum 24 design and integration with plasma liner 12. As is described in more detail below, plenum 24 generally serves as an antechamber for propellant 26 as it transitions from tank 22 to plasma liner 12. Accordingly, the propellant pressure in plenum 24 ("$P_P$") is equal to or greater than (preferably greater than) the propellant pressure in plasma liner 12 ("$P_L$"). Higher plenum pressures can be maintained by a constricting aperture 16 located in the propellant flow path between plenum 24 and plasma liner 12. Thus, plenum 24 at least serves as a propellant pressure reservoir. In some embodiments, plasma ignition occurs within plenum 24 such that high-energy electrons are delivered into plasma liner 12 and aid in plasma ignition within that chamber. For embodiments in which plasma ignition occurs or is designed to occur in plenum 24, then plenum 24 may be constructed of the same or similar materials as described herein for plasma liner 12.

Plenum 24 comprises a housing 41 (also referred to as a plenum chamber) having an upstream end 42 and a downstream end 44 defining an inner volume 46 therebetween. Plenum 24 receives propellant 26 at its upstream end 42 from the propellant source 22, collects the propellant 26 within its inner volume 46 and dispenses the propellant 26 into the plasma liner 12 through its downstream end 44 (e.g., through the aperture 16 or other type of propellant injector device). Aperture 16 defines the gate in the fluid flow path between plenum 24 and plasma liner 12 through which propellant 26 passes. In some embodiments, a passageway 45 (e.g., tubing) is disposed between the downstream end 44 of plenum 24 and the input to aperture 16 to deliver propellant 26 from plenum 24 to aperture 16. In other embodiments, passageway 45 is incorporated directly into plenum 24 and/or aperture 16.

Conveniently, aperture 16 may be centrally located in closed end 14 of plasma liner 12 (e.g., in the center of the flat spiral portion of antenna 40). In some embodiments, aperture 16 is configured to maintain $P_P > P_L$. In other embodiments, the aperture 16 may be located in other areas with respect to the plasma liner 12 (e.g., on the longitudinal sides of the liner 12) and plenum 24, as other design specifics and variables may dictate. In other embodiments, multiple apertures 16 in different locations may be used.

Generally, the volume of plenum 24 is less than the volume of plasma liner 12. The shape of plenum 24 is chosen to ensure that the structural and functional features are met. Plenum 24 may be designed to hold a particular propellant pressure $P_P$, to be sufficiently close to the antenna assembly 40 to cause ionization of the propellant 26 within the plenum 24, and/or to maximize component packing (i.e., thruster assembly) into the smallest three-dimensional volume. For embodiments in which plasma ignition within plenum 24 is desired, plenum 24 may have a cylindrical shape (i.e., substantially circular in cross-section) and, optionally, may comprise one or more magnets (e.g., annular magnets) to contain the plasma away from housing 41 (i.e., towards the center of plenum 24) and/or direct plasma in a downstream direction.

Figure 3:
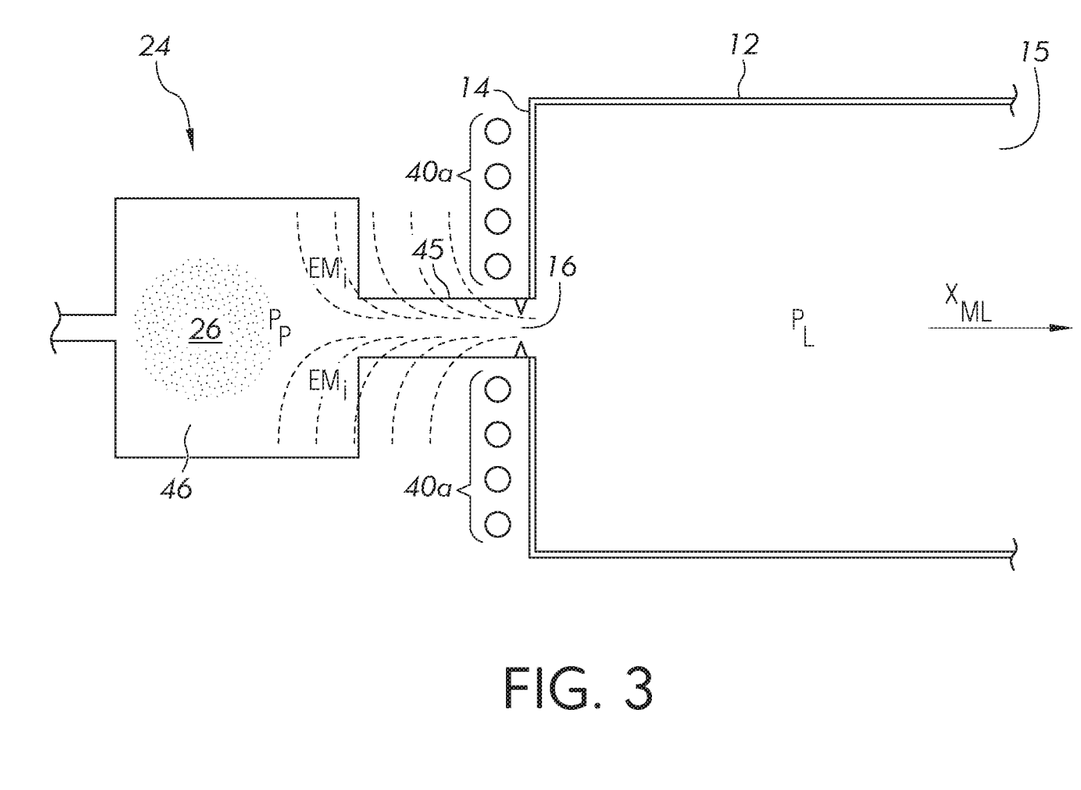
FIG. 3 is a schematic diagram of a plenum and its attachment to a plasma liner and further illustrating plasma ignition in the plenum.

In one embodiment as shown in FIG. 3, the inner volume 46 of the plenum 24 receives RF energy $EM_1$ from the antenna assembly 40, for example, from the flat spiral portion 40a, causing a portion of the propellant 26 within the inner volume 46 to ionize. In one embodiment, the propellant's pressure $P_p$ within the plenum 24 is set to optimize the conditions necessary for the propellant 26 to ionize. In one embodiment, the passageway 45 receives RF energy $EM_1$ causing a portion of the propellant 26 within the passageway 45 to ionize.

Figure 4:
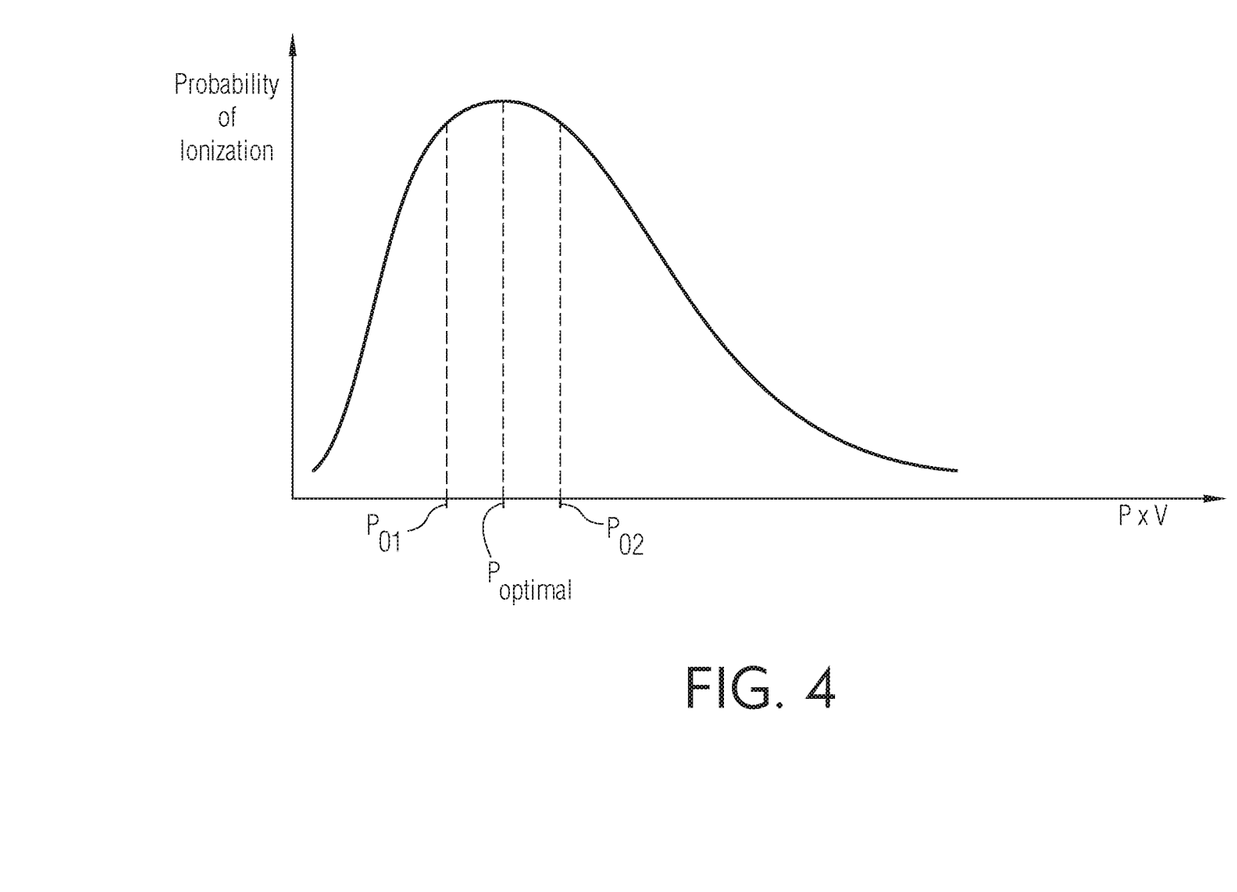
FIG. 4 is a graph showing the probability of propellant ionization vs. pressure x voltage.

FIG. 4 is a graph showing the probability of propellant ionization within the plenum 24 vs. the product of propellant pressure and voltage ($P_p \times V$) within the plenum 24. The probability of ionization peaks when $P_p = P_{optimal}$. Accordingly, given a predetermined and known RF energy $EM_1$ in the plenum 24 provided by the antenna assembly 40 (e.g., the flat spiral antenna portion 40a), the plenum 24 may be designed to provide a propellant pressure $P_p$ equal to $P_{optimal}$ (or within 10% of $P_{optimal}$ as shown by the bounds $P_{O1}$-$P_{O2}$) to maximize the ionization efficiency of the propellant within the plenum 24.

Ionization within the plenum 24 and/or passageway 45 provides electrons (seed electrons) that may flow into the plasma liner 12, where in combination with the RF energy provided by the antenna assembly 40, may induce energization of the propellant 26 into plasma within the plasma liner 12. In this way, the plenum 24 acts as a small source plasma ignition system, and the propellant energization may be more easily achieved within the plasma liner 12 than in a system without a plenum. In sum, the higher plenum pressure relative to the plasma liner pressure facilitates initial plasma ignition within the plenum. High energy electrons from that plasma ignition are then fed into plasma liner 12 which facilitate plasma ignition in the latter chamber despite the fact that the ignition probability may be lower compared to the plenum because of the lower plasma liner pressure.

In some embodiments, the propellant's pressure $P_p$ within the plenum 24 may be about 1×-10,000× of the propellant's pressure $P_L$ within the plasma liner 12, including, for example, about 1, 2, 5, 10, 25, 50, 100, 500, 1,000, 2,500, 5,000, 7,500, or 10,000 times. In other embodiments, the propellant pressure within the plenum 24 ("$P_p$") may be about 0.001, 0.002, 0.005, 0.01, 0.05, 0.1, 0.5, 1, 2, 3, 4, 5, 6, 7, 8, 9, 10 Torr or more. Likewise, the propellant pressure within the plasma liner ("$P_L$") may be about 0.001, 0.002, 0.005, 0.01, 0.05, 0.1, 0.5, 1, 2, 3, 4, 5, 6, 7, 8, 9, 10 Torr or more, but in any event, $P_P$ is equal to or at least slightly greater than $P_L$.

In some embodiments, the plenum's inner volume 46 may be about 1%-50% of the plasma liner inner volume including, for example about 1%, 2.5%, 5%, 7.5%, 10%, 15%, 20%, 25%, 30%, 35%, 40%, 45%, or 50%, or less than about 5%, 7.5%, 10%, 15%, 20%, 25%, 30%, 35%, 40%, 45%, or 50% of the plasma liner inner volume.

The Propellant Injector

Once energized, plasma production within the plasma liner 12 may operate at different steady-state modes with different plasma density profiles versus position in the liner depending on the propellant used and the conditions within the liner 12. With some propellants, these modes may produce diffuse plasma and/or plasma with parabolic density profiles such as a psi-mode ("ψ-mode") plasma. In the latter, the bulk plasma has a higher density along the longitudinal midline $X_{ML}$ of the liner 12 than towards the liner's periphery (e.g., a centrally-peaked mode with a high-density core).

Figure 5:
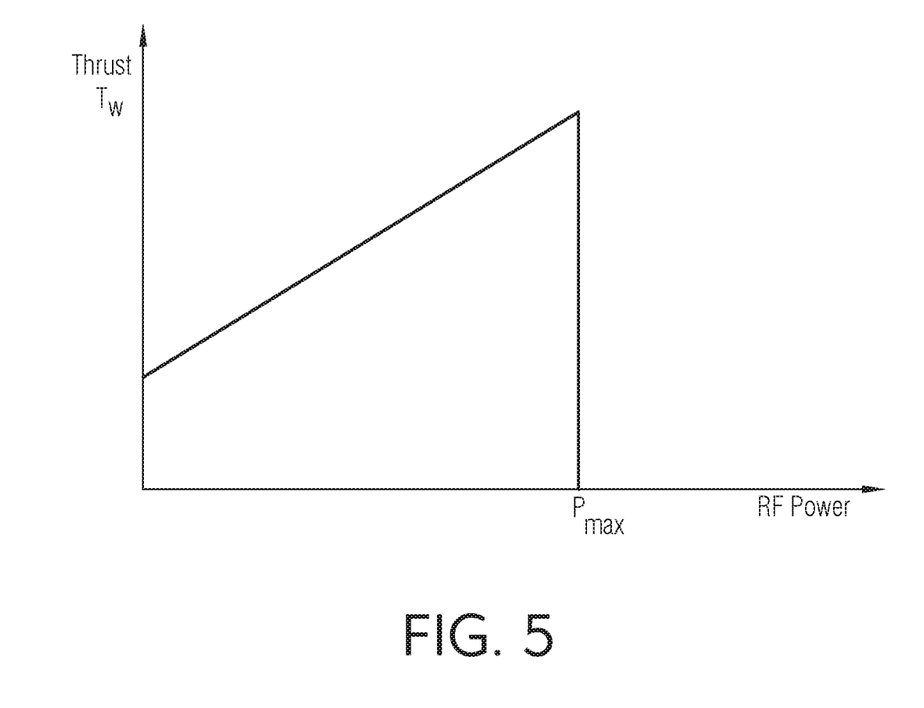
FIG. 5 is a graph showing the relationship between thrust and RF Power input for water vapor propellant.
Figure 6A:
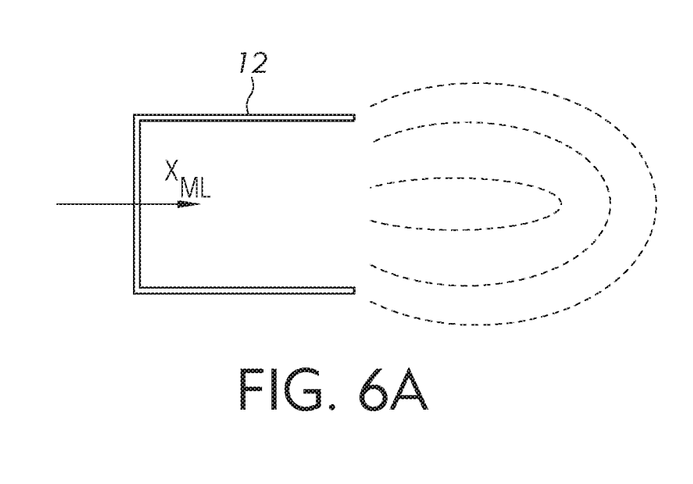
FIG. 6A is a schematic diagram of a plasma plume having a diffuse profile.
Figure 6B:
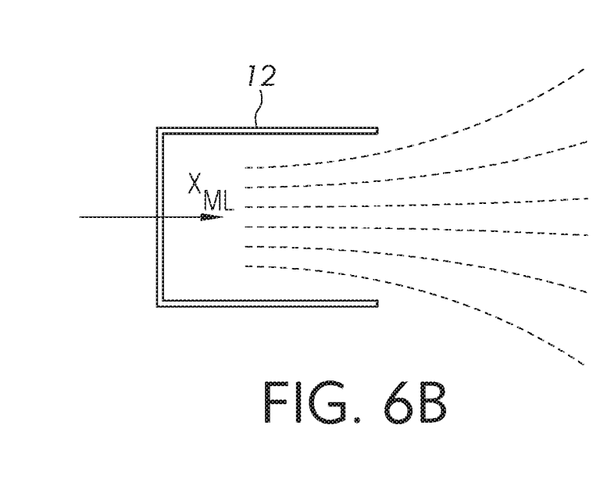
FIG. 6B is a schematic diagram of a plasma plume having a W-mode profile.

A standard plasma production device dispenses propellant into the closed end of the liner through an aperture located at the midline $X_{ML}$. This standard configuration injects propellant directly into the high density region of the plasma. It was discovered through experimentation that some propellants (e.g., water vapor), when ionized at or above critical RF powers results in a loss of thrust and even negative thrust in short duration impulses. FIG. 5 shows the relationship between the applied RF power and the resulting thrust $T_W$ when Using water vapor as the propellant 26. The thrust $T_W$ linearly increases as expected as the RF power is ramped through lower values until an RF power level of $P_{Max}$ is reached. At $P_{Max}$ $T_W$ drops to zero and even turns slightly negative for a short duration in time, indicating "negative thrust impulse." In addition, at $P_{Max}$, the plasma plume at the downstream open end 15 of the of the liner 12 was observed to transition from the expected diffuse profile (FIG. 6A) to a W-mode profile (FIG. 6B). Without wishing to be bound by any theory, it is believed that the high-density core of the Psi-mode plasma is sufficiently dense to obstruct the flow of the propellant 26 into the liner 12 along the midline $X_{ML}$.

Pressure is proportional to the density of the mass of particles and the temperature as shown below:

$$P = k\eta \cdot T$$

where:
P is the pressure;
k is "Boltzamnn's constant"
η is the density of the mass; and
T is the mass's temperature.

Figure 7:
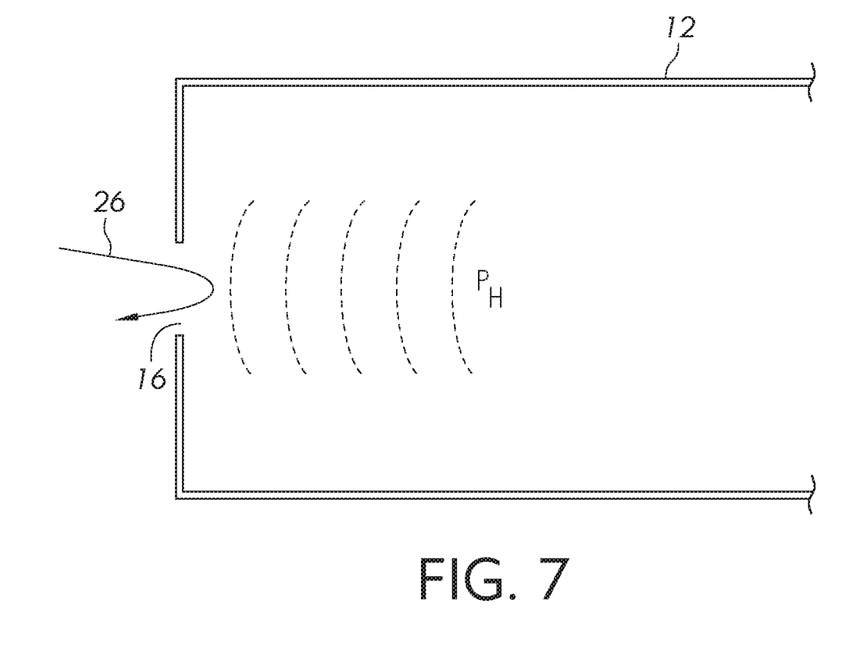
FIG. 7 is a schematic diagram illustrating the propellant flow when $P_H$ exceeds $P_P$.

Accordingly, high-density regions of Psi-mode plasma within the liner 12 create correlating regions of high-pressure $P_H$ particles within the liner 12 ($P_L = P_H$). When $P_H$ exceeds $P_P$ ($P_H > P_P$), these regions of high-pressure $P_H$ may slow or otherwise obstruct the flow of the propellant 26 into the liner 12 from a midline aperture 16, thus limiting the performance of the plasma production device 10. This is shown schematically in FIG. 7.

Figure 8:
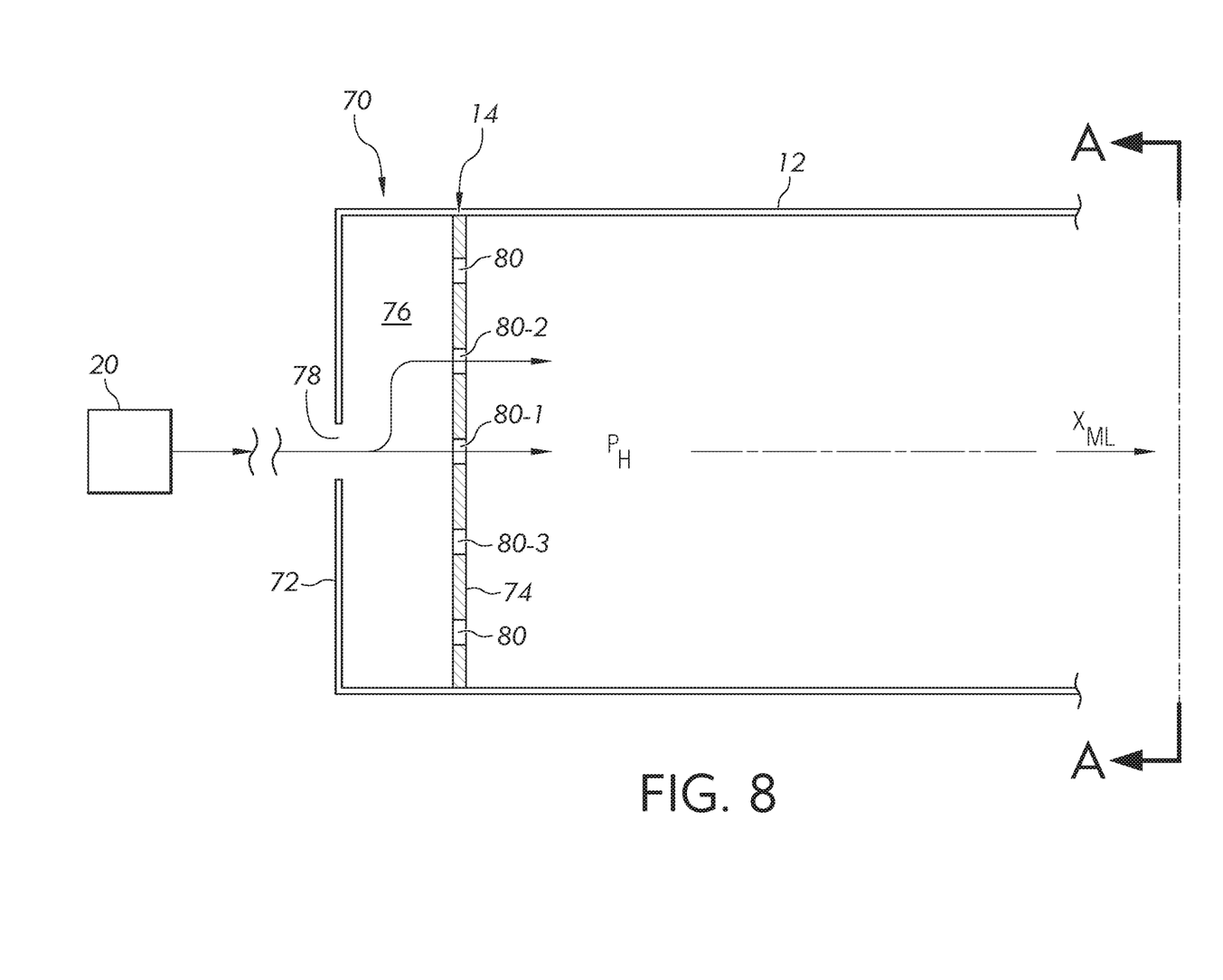
FIG. 8 is a cross-sectional view of a multi-aperture propellant injector.

To counteract the effect and as illustrated in FIG. 8, the plasma production device 10 includes propellant injector 70 having multiple apertures 80 at its closed end 14. Propellant injector 70 has an outer face 72, an inner face 74 and a propellant flow path 76 configured therebetween. Outer face 72 includes at least one outer face aperture 78, and inner face 74 includes two or more inner face apertures 80. Injector 70 receives propellant 26 from the upstream propellant delivery system 20 into outer face aperture 78 and dispenses propellant 26 downstream into plasma liner 12 through two or more inner face apertures 80. In particular, injector 70 is configured to provide multiple propellant flow paths entering plasma liner 12 in contrast to the traditional configuration that provides only a single propellant inlet aligned with the midline axis $X_{ML}$ of plasma liner 12. Various configurations and features of injector 70 are described in detail below.

Figure 9A:
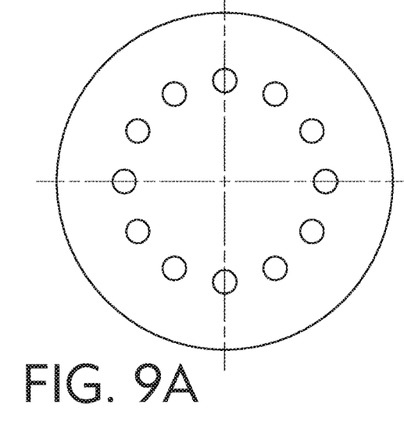
FIGS. 9A-9D are schematic drawings showing exemplary aperture placement patterns for use on a propellant injector.
Figure 9B:
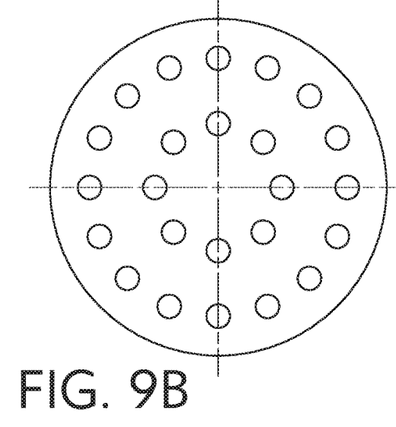
Figure 9C:
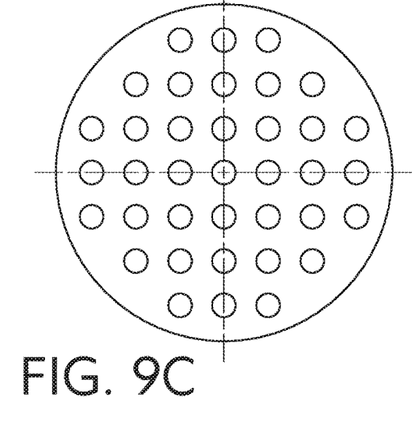

Outer face aperture 78 may be aligned with the midline axis $X_{ML}$ of the plasma liner 12 or it may be offset from this axis. Inner face 74 may have a first inner face aperture 80-1 aligned with the midline axis $X_{ML}$ of the plasma liner 12, and at least a second inner face aperture 80-2 offset from the midline axis $X_{ML}$. (See, for example, FIG. 9C.) Alternatively, inner face 74 may not have an aperture aligned with midline axis $X_{ML}$ such that all apertures 80 are offset from midline axis $X_{ML}$. (See, for example, FIGS. 9A-9B.) Propellant 26 flows through the outer face aperture 78 and into plasma liner 12 via the inner face apertures 80.

By dispensing propellant 26 at a laterally offset location with respect to the midline axis $X_{ML}$ of the plasma liner 12, propellant 26 entering the liner 12 at this laterally offset location may not be blocked or otherwise obstructed by the high-pressure $P_h$ region concentrated along the midline $X_{ML}$ of the liner 12. Instead, propellant 26 enters liner 12 at this laterally offset location, is ionized, the ions are relegated towards the midline by the magnetic fields, and eventually ejected from liner 12 creating thrust. It is understood that the lateral offset between the liner's midline axis $X_{ML}$ and the laterally offset inner aperture(s) 80-1 and/or 80-2 is chosen to place the aperture(s) 80-1 and/or 80-2 sufficiently outside the high-pressure $P_h$ region within the liner 12.

Figure 9D:
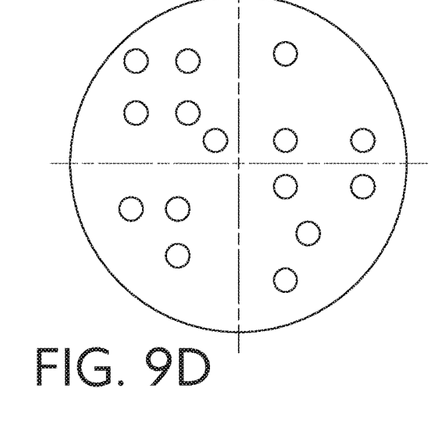

It is understood that the number of apertures 80 present on inner face 74 is not limited to two. Inner face 74 may contain at least 3, 4, 5, 6, 8, 10, 15, 20, 25, 30, 35, 40, or more apertures 80. Apertures 80 may be arranged in any suitable symmetrical or asymmetrical pattern with or without an aperture 80-1 on the liner's midline axis $X_{ML}$. FIGS. 9A-9D illustrate a cross-sectional view along axis A-A (FIG. 8) showing exemplary patterns for apertures 80 including apertures arranged in a single ring (FIG. 9A), concentric rings (FIG. 9B), a grid (FIG. 9C), and a random pattern (FIG. 9D).

It is understood that the example aperture placements and patterns described above are meant for demonstration and that the plurality of inner face apertures 80 may be arranged in any location and/or in any pattern on the inner face 74. It is also understood that the scope of the plasma production device 10 and of the propellant injector 70 is not limited in any way by the patterns or placements of inner face apertures 80.

In one embodiment, the outer face 72 includes two or more outer face apertures 78 in communication with the two or more inner face apertures 80. The injector 70 receives propellant 26 upstream from the propellant delivery system 20 into its two or more outer face apertures 78 and dispenses the propellant 26 downstream into the plasma liner 12 through its two or more inner face apertures 80. The inner face apertures 80 may be placed and arranged as described above with respect to the other embodiments. One or more of the two or more outer face apertures 78 may be laterally offset from midline $X_{ML}$ of the plasma liner 12.

The System as a Thrust-Providing Device

In some embodiments, the plasma production device 10 is configured as a thrust-producing device. As described herein, the propellant 26 is dispensed into the plasma liner 12 (via the plenum 24, aperture 16 and/or the injector 70) and is energized into plasma by the RF energy provided by the antenna assembly 40. The liner 10 and antenna 40 are positioned inside a generated magnetic field provided by the magnet system 60. The magnetic fields have a specified strength as a function of position within the plasma liner 12. The magnetic fields rapidly expand radially in the reference frame of an accelerated plasma particle traveling out of the liner 12 thereby forming a "magnetic nozzle". The magnetic field strength inside liner 12 is such that the ions that are generated within the liner 12 are "weakly magnetized," which implies that ions under a specific temperature perpendicular to the magnetic field will not have orbits that intersect the inner wall of liner 12.

When neutral propellant gas 26 is injected into liner 12, the induced oscillating magnetic fields generated by the currents in the antenna assembly 40 both ionize the propellant gas 26, and then heat the subsequent plasma. The heating directly impacts the electrons, and the electrons are accelerated to very high energies (e.g., ≥50 eV) through inductive and stochastic interactions with the near RF fields from the antenna assembly 40. The electrons, undergoing significant elastic collisions inside liner 12, expand rapidly along the magnetic field lines that run substantially parallel with the longitudinal walls of liner 12.

The magnetic field geometry within liner 12 (set up by the magnet system 60) ensures that electrons maintain enough time in regions of high neutral (i.e., non-ionized propellant 26) density to produce significant ionization of the propellant gas 26 via electron collisions with the neutral particles, and that electrons that are lost are largely lost via expansion in the magnetic nozzle, rather than upstream towards the closed end 14 of liner 12. The rapid flux of electrons into the plume of the thruster creates a momentary charge imbalance in the thruster. The slower positively-charged propellant (e.g., water) ions are then pushed out of the plasma liner 12 via the charge imbalance at a rate sufficient to satisfy overall ambipolar fluxes of particles out of the system. The ion acceleration generated therein is the primary source of thrust when the plasma liner 12 and its associated components are integrated into a thruster.

It will be appreciated by persons having ordinary skill in the art that many variations, additions, modifications, and other applications may be made to what has been particularly shown and described herein by way of embodiments, without departing from the spirit or scope of the invention. Therefore, it is intended that scope of the invention, as defined by the claims below, includes all foreseeable variations, additions, modifications or applications.

What is claimed is:

1. A plasma production device comprising:
    (a) a plasma production chamber having a first closed end comprising an aperture and a second open end;
    (b) a radio frequency (RF) antenna external to the plasma production chamber, electrically coupled to an AC power source, the RF antenna configured to radiate an RF energy based on an RF frequency generated by the AC power source;
    (c) a propellant tank and flow regulator in communication with the plasma production chamber; and
    (d) a plenum, wherein the plenum is disposed between the propellant tank and the plasma production chamber, the plenum comprising a plenum chamber that is external to the plasma production chamber;

wherein the plenum is configured to accept propellant at an upstream end of the plenum chamber from the propellant tank and dispense propellant at a downstream end of the plenum chamber into the plasma production chamber through the aperture;

wherein the plasma production device is configured such that, when propellant is flowing from the propellant tank to the plasma production chamber, the propellant has a plenum pressure (Pp) that is greater than a plasma production chamber pressure (Pc), wherein the RF antenna, in combination with the AC power source, is configured to provide:

a portion of the RF energy to an interior region of the plenum with sufficient power to ionize at least some of the propellant in the plenum thereby producing high-energy electrons that are fed into an interior region of the plasma production chamber, and another portion of the RF energy to the interior region of the plasma production chamber, so to provide, in combination with the high energy electrons, sufficient power to ionize a remaining portion of the propellant in the plasma production chamber, and wherein the plasma production device is an electrothermal RF plasma production device.

2. The plasma production device of claim 1, wherein the RF frequency is in a range from 3 MHz to 300 MHz.

3. The plasma production device of claim 1, wherein the first closed end comprises a closed-end portion of the RF antenna, the close-end portion of the RF antenna being configured to deliver the RF energy to the interior region of the plenum.

4. The plasma production device of claim 1, wherein the high energy electrons generated through ionization of the at least some of the propellant in the plenum and fed to the interior region of the plasma production chamber facilitate plasma ignition within the plasma production chamber.

5. The plasma production device of claim 1, wherein the aperture is configured to maintain Pp>PC when propellant is flowing from the propellant tank into the plasma production chamber.

6. The plasma production device of claim 1, wherein the propellant tank comprises a solid or liquid propellant.

7. The plasma production device of claim 6, wherein the propellant is selected from a group consisting of: ammonia, iodine (I2), water, water vapor, bismuth, magnesium, cesium, zinc, caffeine, methane (CH4), ethane (C2H6), propane (C3H8), butane (C4H10), other higher order alkanes, and hydrogen peroxide.

8. The plasma production device of claim 6, wherein the propellant is selected from a group consisting of: xenon, krypton, argon, air and other N2-O2 mixtures, nitrogen (N2), oxygen (O2), carbon dioxide (CO2), and dinitrogen oxide (N2O).

9. A plasma production device comprising:
(a) a downstream plasma production chamber having a cylindrical body with a first closed end for receiving a propellant and a second open end for exiting a plasma formed by ionization of the propellant within the downstream plasma production chamber;
(b) a radio frequency (RF) antenna external to the downstream plasma production chamber, electrically coupled to an AC power source, and configured to deliver an RF energy to an interior region of the downstream plasma production chamber; and
(c) an upstream propellant tank and flow regulator in communication with the downstream plasma production chamber, the upstream propellant tank and flow regulator being external to the downstream plasma production chamber, wherein the cylindrical body of the downstream plasma production chamber comprises a propellant injector for receiving the propellant at the first closed end of the downstream plasma production chamber, the propellant injector providing a propellant flow path between an outer face and an inner face of the propellant injector, wherein the outer face of the propellant injector comprises at least one outer face aperture at the first closed end for receiving of the propellant from the upstream propellant tank, wherein the inner face of the propellant injector comprises a plurality of inner face apertures, wherein the plasma production device is an electrothermal RF plasma production device, wherein all of the plurality of inner face apertures are laterally offset relative to a longitudinal axis of the cylindrical body of the downstream plasma production chamber, and wherein the at least one outer face aperture consists of a single outer face aperture that is laterally offset relative to the longitudinal axis of the cylindrical body of the downstream plasma production chamber.

10. The plasma production device of claim 9, wherein the plurality of inner face apertures comprises one inner face aperture aligned with the longitudinal axis of the cylindrical body.

11. The plasma production device of claim 10, wherein the plurality of inner face apertures further comprises a plurality of inner face apertures that are laterally offset relative to the longitudinal axis of the cylindrical body of the downstream plasma production chamber.

12. The plasma production device of claim 9, wherein the upstream propellant tank comprises a solid or liquid propellant.

13. A plasma production device comprising:
(a) a downstream plasma production chamber having a cylindrical body with a first closed end for receiving a propellant and a second open end for exiting a plasma formed by ionization of the propellant within the downstream plasma production chamber:
(b) a radio frequency (RF) antenna external to the downstream plasma production chamber, electrically coupled to an AC power source, and configured to deliver an RF energy to an interior region of the downstream plasma production chamber;
(c) an upstream propellant tank and flow regulator in communication with the downstream plasma production chamber, the upstream propellant tank and flow regulator being external to the downstream plasma production chamber; and
(d) a plenum disposed between the upstream propellant tank and the downstream plasma production chamber, wherein the cylindrical body of the downstream plasma production chamber comprises a propellant injector for receiving the propellant at the first closed end of the downstream plasma production chamber, the propellant injector providing a propellant flow path between an outer face and an inner face of the propellant injector, wherein the outer face of the propellant injector comprises at least one outer face aperture at the first closed end for receiving of the propellant from the upstream propellant tank, wherein the inner face of the propellant injector comprises a plurality of inner face apertures, wherein the plasma production device is an electrothermal RF plasma production device, wherein the plenum is configured to accept propellant at an upstream end from the upstream propellant tank and dispense propellant at a downstream end into the downstream plasma production chamber through a plenum aperture, wherein the plasma production device is configured such that, when propellant is flowing from the upstream propellant tank to the downstream plasma production chamber, the propellant has a plenum pressure (Pp) that is greater than a plasma production chamber pressure (Pc), and wherein the RF antenna, in combination with the AC power source, is further configured to provide an RF energy to an interior region of the plenum with sufficient power to ionize at least some of the propellant in the plenum.

14. The plasma production device of claim 13, wherein the RF energy radiated from the RF antenna is in a frequency range from 3 MHz to 300 MHZ, and wherein the frequency range provided by the AC power source.

15. The plasma production device of claim 13, wherein high-energy electrons generated through ionization of at least some of the propellant in the plenum are delivered to the downstream plasma production chamber to facilitate plasma ignition within downstream plasma production chamber.

16. The plasma production device of claim 13, wherein the first closed end comprises a closed-end portion of the RF antenna that is configured to deliver the RF energy to the interior region of the downstream plasma production chamber and to the interior region of the plenum.

17. The plasma production device of claim 13, wherein the plenum aperture is configured to maintain Pp>PC when propellant is flowing from the upstream propellant tank into the downstream plasma production chamber.

18. The plasma production device of claim 17, wherein the propellant pressure (Pp) is established to optimize probability of propellant ionization in the plenum.

* * * * *